(12) United States Patent
Huang et al.

(10) Patent No.: US 6,350,803 B1
(45) Date of Patent: Feb. 26, 2002

(54) FORMULATION OF CONDUCTIVE PUTTY

(75) Inventors: Kuo-Lun Huang; Ming-Cheng Chang, both of Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/481,125

(22) Filed: Jan. 11, 2000

(30) Foreign Application Priority Data

Nov. 5, 1999 (TW) .................................... 088119383

(51) Int. Cl.[7] .............................. C08J 5/10; C08K 3/08; C08L 63/00
(52) U.S. Cl. ..................................................... 524/440
(58) Field of Search ........................................ 524/440

(56) References Cited

U.S. PATENT DOCUMENTS 5,008,309 A * 4/1991 Ibe et al. ..................... 523/442
5,183,594 A * 2/1993 Yoshinaka et al. .......... 252/518

\* cited by examiner

Primary Examiner—James J. Seidleck
Assistant Examiner—U. K. Rajguru
(74) Attorney, Agent, or Firm—Wei Te Chung

(57) ABSTRACT

A formulation of conductive putty is disclosed for forming a uniform coating on the surface of a metallic product prior to painting. The formulation of the putty comprises a ketone solvent, epoxy resin, calcium carbonate clay, pigment and metallic powder having a specific conductance. Use of the putty simplifies the finishing procedure, decreases the weight and thickness of the finished product, decreases handling cost and results in a product having an improved appearance.

4 Claims, 2 Drawing Sheets

FORMULATION OF CONDUCTIVE PUTTY

BACKGROUND OF THE INVENTION

1. Field of the Invention

The present invention relates to a formulation of conductive putty, and particularly to a formulation of conductive putty which helps in forming a uniform coating on surfaces of metallic products prior to electrostatic painting or finish painting.

2. Description of the Prior Art

Paint baking technology is often used to finish metallic products in the automobile, computer enclosure and other electronic industries. In a paint baking process, firstly, sprayed paint drops with static electricity of different polarity to the products, thereby the paint drops can be absorbed to the surface of the products. Secondly, baking the products to form a surface coating film thereon. However, the surface coatings of this technology are rapidly developing to keep pace with the use of new materials (such as magnesium alloys), and stricter requirements are being made in this field.

Roughened surfaces are usually formed during fabrication of metallic products and have a detrimental effect on the appearance of the products, so the products are often slushed in dented or uneven areas before being baking painted. The formulation of conventional putty used for such slushing comprises a solvent, resin, clay and pigment. This putty is usually nonconductive, resulting in an uneven distribution of electrical potential on the surfaces of the products, which in turn causes difficulties in painting, including uneven thickness, rippling and peeling of finish coatings. Additionally, as shown in FIG. 1, the slushing, buffing, finish painting and baking steps are often repeated several times to satisfactorily eliminate superficial defects in the product, thereby making the finishing procedure complicated and increasing handling costs. Besides, buffing after chemically treating damages the chemically modified film which protects the surfaces of the product from corroding. Furthermore, the priming step, which promotes adhesion of the finish paint to the surfaces of the product, and makes inspection of the smoothness of the product surfaces easier, and improves the paint absorbability of the product surface. However, the priming step acts to thicken the surfaces of the product and adds weight to the product, thereby contributing to poor assembly precision and increasing production costs.

SUMMARY OF THE INVENTION

An object of the present invention is to provide a formulation of conductive putty to help in forming a uniform coating on surfaces of metallic products during electrostatic painting or finish painting, the formulation comprising pigments and metallic powder;

Another object of the present invention is to provide a simplified procedure for applying a finish to metallic products, omitting the priming step of the conventional art, and thereby decreasing the thickness and weight of the finished products; and Another object of the present invention is to protect the integrity of a chemically modified film on surfaces of metallic products thereby reliably inhibiting corrosion of the products.

A formulation of putty in accordance with the present invention comprises a ketone solvent, epoxy resin, calcium carbonate clay, and metallic powder having a specific conductance. The putty promotes formation of a uniform coating on surfaces of metallic products prior to electrostatic painting or finish painting.

Other objects, advantages and novel features of the invention will become more apparent from the following detailed description of the preferred embodiment when taken in conjunction with the accompanying drawings.

DETAILED DESCRIPTION OF THE PREFERRED EMBODIMENT

A formulation of putty in accordance with the present invention comprises ketone solvent, epoxy resin, calcium carbonate clay, pigment and metallic powder having a specific conductance, a percentage by weight of the metallic powder in the putty being in the range of 45~55%. In this exemplary embodiment the ratio of the total of ketone solvent, epoxy resin, calcium carbonate clay and pigment to copper powder is 1:1.

Figure 1:
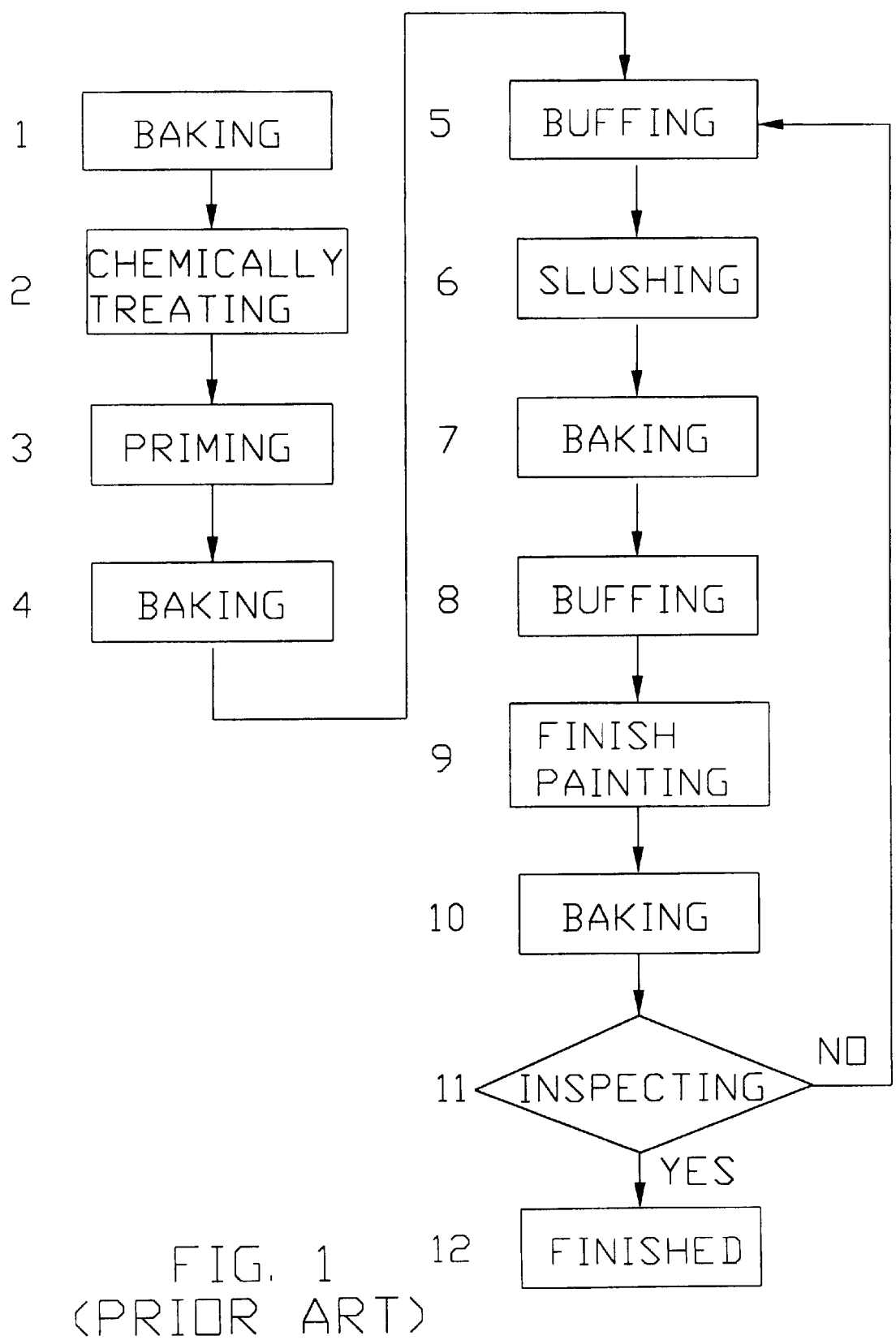
FIG. 1 is a flow diagram of the conventional art.
Figure 2:
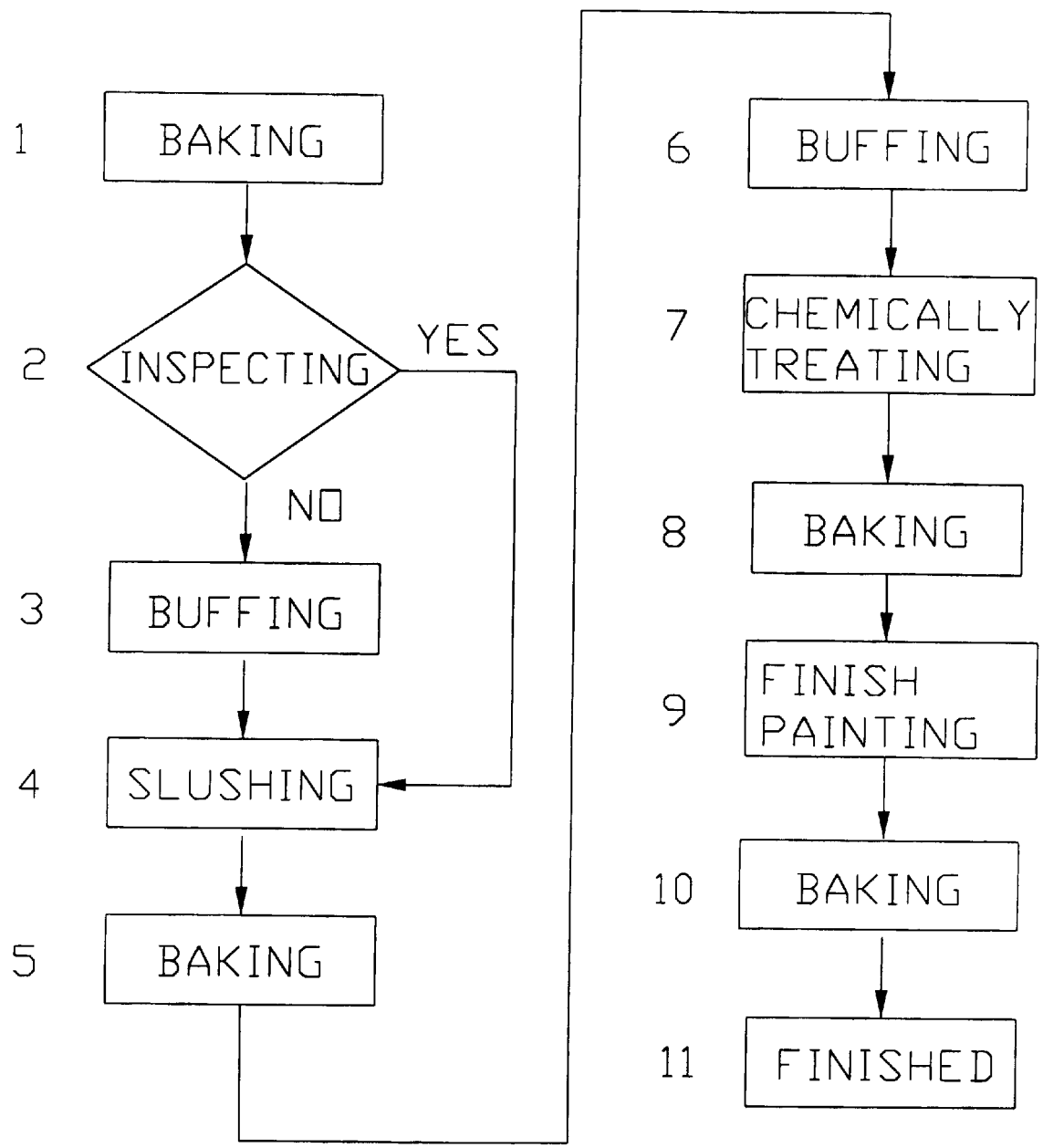
FIG. 2 is a flow diagram of the present invention.

Referring to FIG. 2, a mechanically fabricated metallic product is initially baked in a conventional oven to be dried. Then the product is inspected to determine if the optional third step is necessary. If the surface of the product is not too rough, the product can next be slushed; otherwise, the product is next buffed in the optional third step prior to being slushed. The slushing step uses the putty having the formulation of the present invention, making the surface of the slushed areas of the product equal in conductance to the surfaces of the surrounding unslushed areas, and promoting a uniform coating during the following finish painting step. The slushed product is baked to harden the putty. Following the baking step, the product is buffed to smooth the surface thereof. The product is chemically treated after being buffed to provide a protective film inhibiting the product from corroding and to promote adhesion of the finish paint to the product surface. The chemically treated product is baked to eliminate water left by the chemically treating step. The process is completed after the finish painting step and the baking step.

The formulation of the putty of the present invention promotes formation of a uniform coating on the surface of the metallic product and simplifies the finishing procedure. The priming step is omitted and the slushing, buffing, finish painting and baking steps are not repeated, so the thickness and weight of the product are reduced and the handling cost is decreased.

It is to be understood, however, that even though numerous characteristics and advantages of the present invention have been set forth in the foregoing description, the disclosure is illustrative only, and changes may be made in detail within the principles of the invention to the full extent indicated by the broad general meaning of the terms in which the appended claims are expressed.

What is claimed is:

1. A formulation of conductive putty consisting of:

calcium carbonate clay for filling dented areas of a surface of a metallic product;

metallic powder having a specific conductance which enables the putty to have a conductance which matches a conductance of undented surface areas of the metallic product;

epoxy resin for binding the calcium carbonate clay and the metallic powder; and ketone solvent for diluting and mixing the calcium carbonate clay, the metallic powder and the epoxy resin;

wherein a percentage by weight of a total of the ketone solvent, the epoxy resin and the calcium carbonate clay is in a range of 45~55% and a percentage by weight of the metallic powder is in a range of 45~55%.

2. The formulation of the conductive putty as claimed in claim 1, wherein the metallic powder contains copper powder.

3. The formulation of the conductive putty as claimed in claim 1, wherein the formulation further comprises pigment to distinguish the dented areas from the surrounding surface areas of the metallic product.

4. A composition of conductive putty consisting of:

calcium carbonate clay;

metallic powder having a specific conductance to match that of the clay;

epoxy resin included in an amount sufficient to bind the calcium carbonate clay and the metallic powder; and ketone solvent included in an amount sufficient to dilute and mix the calcium carbonate clay, the metallic powder and the epoxy resin;

wherein the percentage by weight of the metallic powder in the putty is approximately 50%.

* * * * *